(12) United States Patent
Kotzev

(10) Patent No.: US 6,291,544 B1
(45) Date of Patent: *Sep. 18, 2001

(54) REACTIVE ESTERS OF 2-CYANOPENTA-2,4-DIENOIC ACID AND THE ADHESIVES AND POLYMERS THEREOF

(75) Inventor: Dimiter Lubomirov Kotzev, Northants (GB)

(73) Assignee: Chemence, Inc., Alpharetta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,661

(22) Filed: Aug. 10, 1998

Related U.S. Application Data

(60) Provisional application No. 60/055,794, filed on Aug. 15, 1997.

(51) Int. Cl.[7] ........................................... C08F 2/48
(52) U.S. Cl. .................. 522/173; 522/6; 522/70; 522/75; 522/80; 522/182; 522/184; 526/77; 526/89; 526/215; 427/517; 427/207; 427/516
(58) Field of Search ................. 427/517, 207.1, 427/516; 526/77, 89, 215; 522/6, 75, 70, 80, 173, 182, 184

(56) References Cited

U.S. PATENT DOCUMENTS

| | | | |
|---|---|---|---|
| 3,554,990 | * 1/1971 | Quinn et al. | 428/522 |
| 4,313,865 | * 2/1982 | Teramoto et al. | 512/5 |
| 4,425,471 | * 1/1984 | Millet | 526/298 |
| 4,793,886 | * 12/1988 | Okamura et al. | 156/307.3 |
| 4,933,234 | * 6/1990 | Kobe et al. | 428/336 |
| 5,187,048 | * 2/1993 | Woods et al. | 430/286.1 |
| 5,340,873 | * 8/1994 | Mitry | 525/10 |
| 5,386,047 | * 1/1995 | Nakos et al. | 556/416 |

\* cited by examiner

*Primary Examiner*—James J. Seidleck
*Assistant Examiner*—Sanza McClendon
(74) *Attorney, Agent, or Firm*—Brobeck, Phleger & Harrison LLP

(57) ABSTRACT

The present invention provides pure, storage stable, reactive esters of 2-cyanopenta-2,4-dienoic acid and the adhesives and polymers thereof. The monomers of the present invention have the formula:

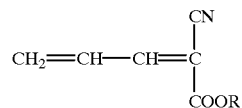

Figure 1:
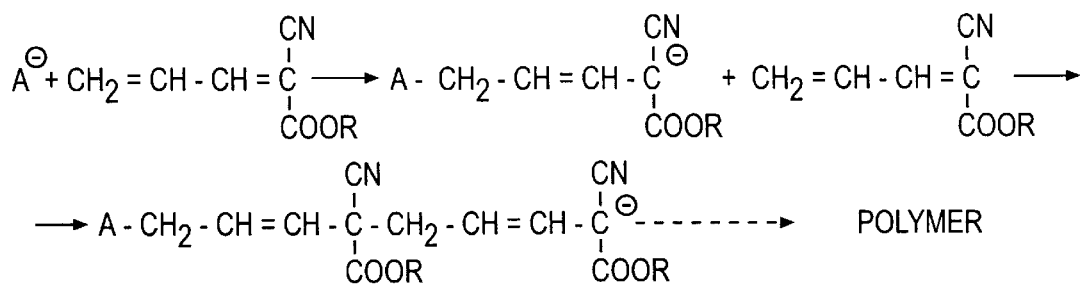
Figure 1:
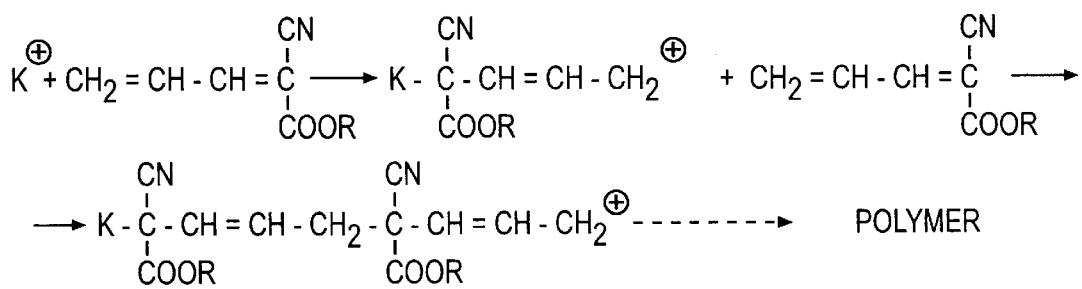
Figure 1:
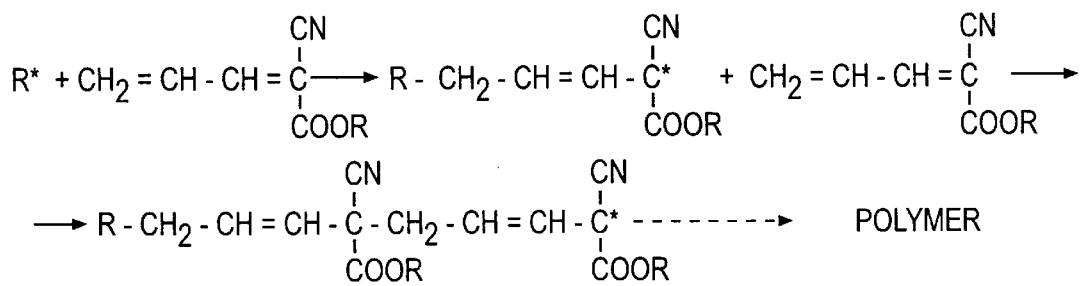

where R is alkyl, alkenyl, alkynyl, alkoxyalkyl, alkenyloxyalkyl, alkynyloxyalkyl, poly(oxyalkyl), aryl, cycloalkyl or a heterocyclyc radical. R may also be one of the foregoing moieties substituted with one or more of the other moieties; this includes the case of the substituent itself being substituted, and may also contain halogens.

The reactive monomers of the present invention can be formulated into adhesives by incorporating certain modifiers and additives such as polymeric thickeners, viscocity regulators, plasticizers, thixotrophic agents, compatibilizers, adhesion promoters, pigments and colorants, fillers, deodorants and perfumes. They can also be used in composition with other monomers containing a reactive double bond such as for example cyanoacrylates.

13 Claims, 4 Drawing Sheets

A. ANIONIC INITIATION

B. CATIONIC INITIATION

C. RADICAL INITIATION

REACTIVE ESTERS OF 2-CYANOPENTA-2,4-DIENOIC ACID AND THE ADHESIVES AND POLYMERS THEREOF

This application claims benefit to Provisional application 60/055,794 filed Aug. 15, 1997.

This invention relates to reactive esters of 2-cyanopenta-2,4-dienoic acid and the adhesives and polymers thereof.

Esters of the 2-cyanopenta-2,4-dienoic acid have been reported in the patent literature. The ethyl (U.S. Pat. No. 3,316,227), alkenyl and alkoxyalkyl (U.S. Pat. No. 3,554,990) esters have been particularly described. These monomers can polymerise under the influence of weak alkali and are suitable for adhesives. Their use as modifiers to cyanoacrylate adhesives (U.S. Pat. No. 4,425,471) and for the manufacture of photoresists (EP 0404 446 A2) has also been reported. All of the cyanopentadienoates reported in the literature were obtained and used in non-purified form, which renders them unstable for storage and does not reveal fully their inherent adhesive properties.

The present invention provides pure, storage stable, reactive esters of 2-cyanopenta-2,4-dienoic acid and the adhesives and polymers thereof. The monomers of the present invention have the formula:

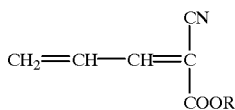

where R is alkyl, alkenyl, alkynyl, alkoxyalkyl, alkenyloxyalkyl, alkynyloxyalkyl, poly(oxyalkyl), acryl, cycloalkyl or a heterocyclyc radical. R may also be one of the foregoing moieties substituted with one or more of the other moieties; this includes the case of a substituent itself being substituted. R may also contain halogens.

Specific examples of R are methyl, ethyl, allyl, methoxyethyl, ethoxyethyl.

The reactive monomers of this invention are obtained by reacting acrolein with

where R is the same radical as described above. The reaction of acrolein with cyanoacetates is chemically consistent in nature to the reaction of acrolein with active methylene compound as described in U.S. Pat. No. 3,316,227. All of the considerations derived in this reference hold true for the present reaction between acrolein and cyanoacetates.

A distinctive feature of the reactive monomers of the present invention is that they are purified by one or more consecutive distillations under vacuum.

A distinctive feature of the reactive monomers of the present invention is that they posses improved shelf-life in monomeric form compared to non-purified monomers.

A distinctive feature of the reactive monomers of the present invention is that they have quicker setting time when used as adhesives, compared to non-purified monomers.

A distinctive feature of the reactive monomers of the present invention is that they can polymerise to high molecular weight polymers via anionic, cationic or radical mechanism (FIG. 1) as well as via a combination of any of them.

A distinctive feature of the reactive monomers of the present invention is their universal adhesion towards metals, plastics, rubbers, glass, wood, paper, live soft or bone tissue. Adhesive bond is formed within seconds to minutes at ambient temperature when the reactive monomers or their formulated adhesives are spread as a thin film between the substrates.

A distinctive feature of the reactive monomers of the present invention is that their adhesive bonds have higher bond strength, higher temperature and moisture resistance, compared to non-purified monomers.

A distinctive feature of the reactive monomers of the present invention is that the monomers and the adhesive bond and polymers thereof are free from impurities from the manufacturing process, compared to non-purified monomers.

A distinctive feature of the reactive monomers of the present invention is that their purity makes them especially suitable for bonding soft or bone tissue, as well as for embolic and occluding agent, in medicine and surgery. An added advantage is that the resultant polymeric adhesive jointing layer is rubbery at body temperature.

A distinctive feature of the reactive monomers of the present invention is that they are stabilised with anionic and free-radical polymerisation inhibitors. Anionic polymerisation inhibitors could be sulfur dioxide, hydrogen fluoride, phosphoric, phosphonic, sulfuric, sulphonic, carboxylic and organic sulfonic acids, sultones, boron trifluoride and its complexes, and phosphazenes for example. The free-radical polymerisation inhibitors are usually hydroquinone, p-methoxyphenol, t-butyl catehol, butylated hydroxytoluene or butylated hydroxyanisole, for example.

The inhibitors are normally used in small amounts of from 0.00001 to 1% by weight of the monomer. The preferred quantities for the above mentioned inhibitors are: acidic gasses—from 0.0001% to 0.06%; acids—from 0.0001% to 0.01%; sultones—from 0.001% to 0.1%; boron trifluoride—from 0.0001% to 0.01%; phosphazenes—from 0.00001% to 0.001%; free-radical inhibitors—from 0.001% to 1%. The foregoing percentages are percentages by weight of the reactive monomer. It should be noted that the quantity of inhibitor will influence the onset of polymerisation of the monomers of the present invention and could be used as a means to control the setting time of the adhesives.

The reactive monomers of the present invention may contain polymerisation initiators. They could be anionic polymerisation initiators like pyridine, aminopyridine, vinylpyridine, methoxyethylpyridine, piperidine, picoline, lutidine, N,N-dimethyl-p-toluidine, triphenylphosphine, triethylphosphine, tribenzylamine, triethylamine, benzyldimethylamine, diethylenetriamine, polyvinylpiridine, calixarenes, tertiary amine-SO$_3$ complexes, polyethylene glycol, phenolformaldehyde resins, vinylimidazole, triethanolaminatotitanium, aminosilanes, phosphites, metal acetylacetonates, N-(oxydiethylene)benzothiazole-2-sulfenamide, bismuth dimethyldithiocarbonate, as well as alcohols, bases and hydroxyl or amine group containing compounds. They could be cationic polymerisation initiators. They could be free-radical polymerisation initiators such as methylethylketone peroxide, cyclohexyl peroxide, cumene hydroperoxide, dibenzoyl peroxide or redoxy systems for generating free-radicals. Compounds which generate radicals or ions under visible, ultraviolet or electron-beam irradiation could also be used to initiate polymerisation of the reactive monomers of the present invention. The various initiators could be used alone or in conjunction with each other.

The reactive monomers of the present invention can be formulated into adhesives by incorporating certain modifiers and additives such as polymeric thickeners, viscosity regulators, plasticisers, thixotropic agents, compatibilisers, adhesion promoters, pigments and colourants, fillers, deodorants and perfumes. They can also be used in composition with other monomers containing a reactive double bond, cyanoacrylates for example.

Application of the reactive monomers of the present invention is in structural and industrial, as well as in medical and surgical adhesives, sealants and coatings.

The above mentioned applications are only indicative and do not limit the scope of application of the reactive monomers of the present invention, as well as the applications of their adhesives and polymers.

The invention is illustrated by the following examples:

EXAMPLE 1

Figure 2:
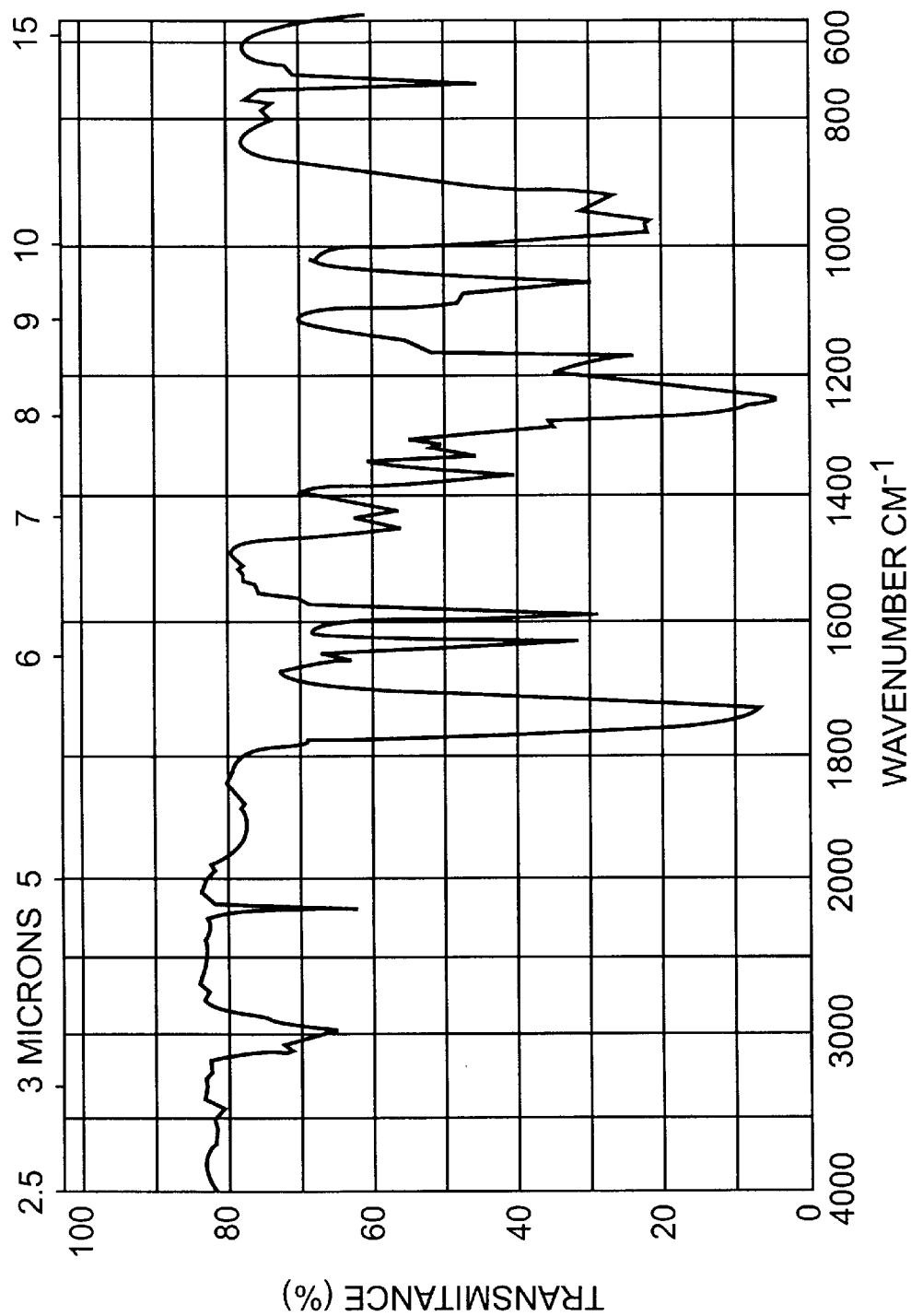

Catalyst is dispersed into a mixture of 0.5 g mole allyl cyanoacetate and solvent (see Table 1) and the temperature is reduced to 18° C. Acrolein is then added dropwise while the mixture is cooled so that the reaction temperature does not exceed 20° C. The molar ratio of acrolein to allyl cyanoacetate is 1.2:1.0. The type and quantity of catalyst and solvent is stated in Table 1. After the addition of acrolein is completed the reaction is continued at 20° C. until the catalyst is dissolved and clear transparent solution is obtained. Extraction solvent (see Table 1) is added in the same amount by volume to the reaction mixture. Then two consecutive catalyst wash-out steps are performed by using 2N HCl (the volume ration of HCl solution to organic product solution being 1:2). When the mixture is left to settle two distinct layers are formed. The water layer is dropped out and the wash repeated. The organic layer can be further dried with inorganic or organic drying agents (see Table 1). In a separate step the organic layer is subjected to vacuum distillation with gradual increase of temperature and vacuum to remove the solvents and finally to distill the allyl 2-cyanopenta-2,4-dienoate. To prevent spontaneous polymerisation of the product it was found that it is well stabilised with 1000 ppm of hydroquinone and 10 ppm of methanesulfonic acid, which are placed in the receiver. In the distillation pot it is also necessary to employ hydroquinone for prevention of radical polymerisation and a choice of acids, i.e. sulfuric, methanesulfonic, p-toluenesulfonic, tetraphosphoric etc. The allyl 2-cyanopenta-2,4-dienoate could easily be redistilled if the same precautions are taken. The results of 9 syntheses utilising various catalysts, solvents and drying agents are presented in Table 1. Allyl 2-cyanopenta-2,4-dienoate distills at 68° C. at 0.25 mm Hg and has $n_D^{20}$=1.5130. IR spectrum (FIG. 2) confirms the structure of allyl 2-cyanopenta-2,4-dienoate.

EXAMPLE 2

Figure 3:
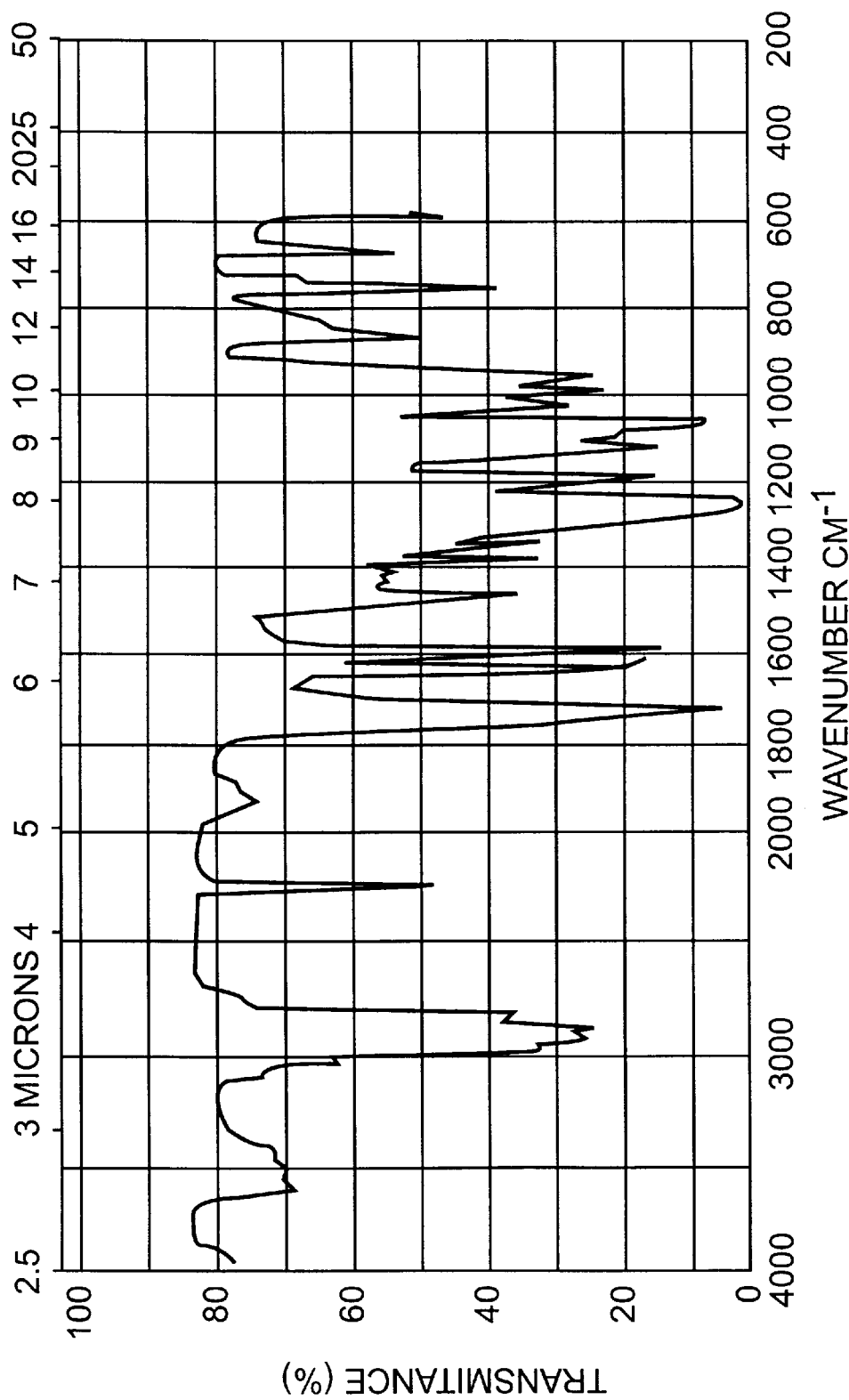
Figure 4:
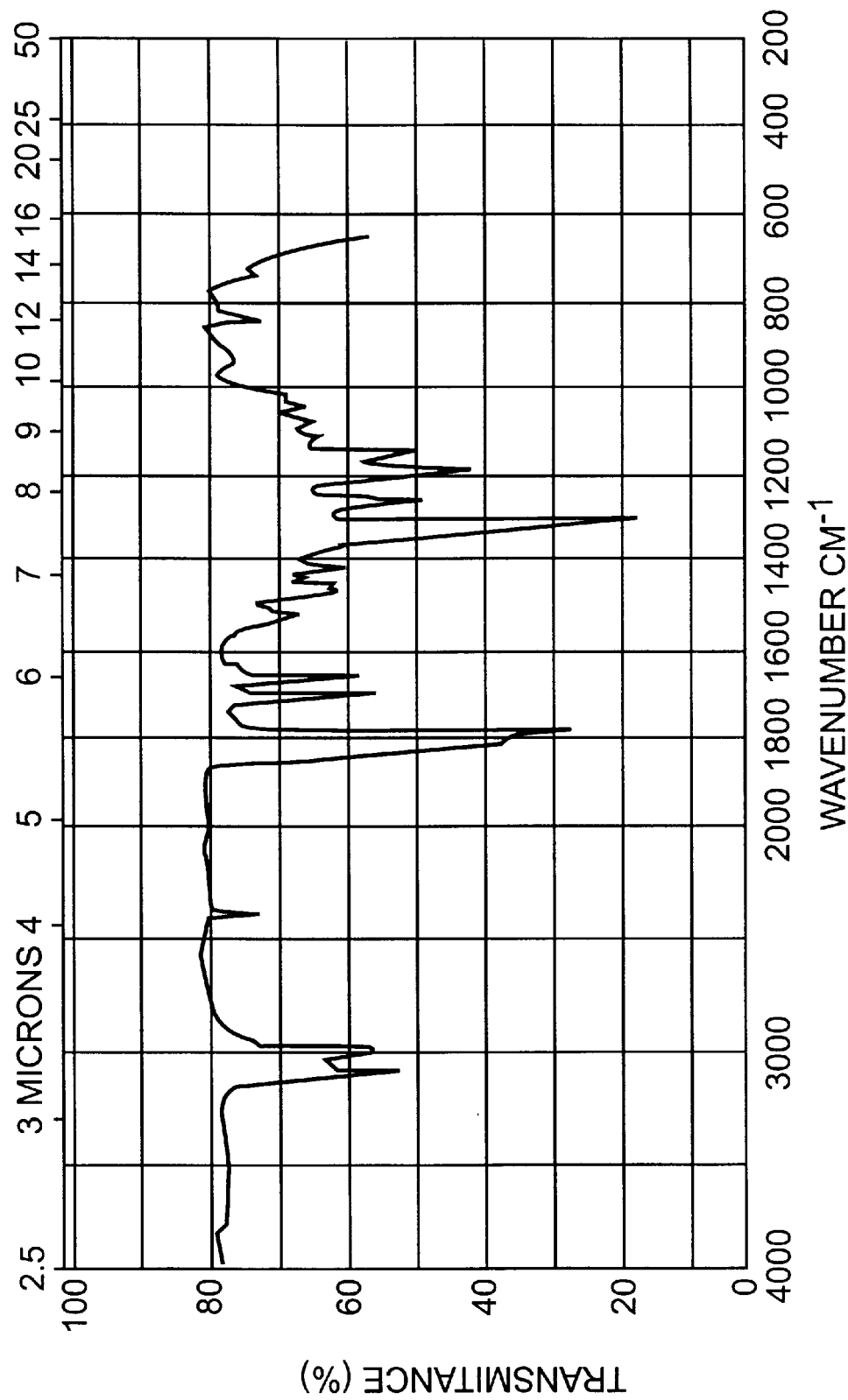

Synthetic procedures similar to those described in Example 1 but using methoxyethyl cyanoacetate and ethoxyethyl cyanoacetate were carried out. The reaction conditions and properties of the distilled methoxyethyl and ethoxyethyl 2-cyanopenta-2,4-dienoates are summarised in Table 2. FIG. 3 and FIG. 4 show their IR spectra.

EXAMPLE 3

The purified by distillation monomers of allyl, methoxyethyl and ethoxyethyl 2-cyanopenta-2,4-dienoates were colourless liquids at room temperature with light pleasant odour. When a drop of them is placed between two fingers it polymerises in a matter of seconds to form an elastic bond. The same action and speed was displayed on various substrates—metals, plastics, rubbers, glass. The curing time depends on the level of stabilisers in the monomer. If no stabilisers are used the action is almost instant, however the product in a few hours polymerises in bulk. When bases, acids, amines, hydroxyl group containing compounds, water are added to stabilised, distilled cyanopentadienoate, they initiate polymerisation of the monomer, transforming it to a tough, resilient, rubber-like material.

EXAMPLE 4

Freshly distilled allyl 2-cyanopenta-2,4-dienoate containing 5 ppm of $SO_2$ from the distillation process was used as base material. Samples with various content of hydroquinone and methanesulfonic acid were prepared, place in 5 $cc^3$ bottles made of high density polyethylene and kept at room temperature. Stability was measured as the time interval before the onset of gelation. The results are presented in Table 3.

EXAMPLE 5

Adhesive bonds based on the reactive monomers of the present invention were prepared by placing a drop of monomer on one surface to which the other was manually pressed for 1 min. Adhesive strength was measured after 24 hours and after ageing for 24 hours at various temperatures. The specimens had dimensions in accordance with ASTM D897, ASTM D1002 and ASTM D903 for tensile, shear and peel strength determinations respectively. The steel surfaces were roughened with extrafine sandpaper and degreased with methylene chloride. No chemical treatment of the surfaces was employed. The testing procedure followed the above mentioned standards. The obtained results are summarised in Table 4. Heating steel/steel joints bonded with allyl 2-cyanopenta-2,4-dienoate for 24 h at 200° C. did not delaminate them and they sustained loads of 33 kg/cm² and 20 kg/cm² in tensile and shear mode respectively. A value of 2.8 N/mm was obtained for 180° peel test on steel strips bonded with allyl 2-cyanopenta-2,4-dienoate.

TABLE 1

Reaction conditions of the allyl 2-cyanopenta-2,4-dienoate synthesis

| No | Catalyst, wt % to allyl cyanoacetate | Solvent, wt % to allyl cyanoacetate | Wash/extraction details | Drying agent, wt % to allyl cyanoacetate | Yield of distilled allyl 2-cyanopenta-2,4-dienoate (wt. % to allyl cyanoacetate) |
|---|---|---|---|---|---|
| 1 | zinc chloride, 64.8 | dioxane, 250 | diethyl ether solution; HCl | none | 84 |
| 2 | zinc chloride, 64.6 | dioxane, 250 | ethyl acetate solution; HCl | none | 72 |

TABLE 1-continued

Reaction conditions of the allyl 2-cyanopenta-2,4-dienoate synthesis

| No | Catalyst, wt % to allyl cyanoacetate | Solvent, wt % to allyl cyanoacetate | Wash/extraction details | Drying agent, wt % to allyl cyanoacetate | Yield of distilled allyl 2-cyanopenta-2,4-dienoate (wt. % to allyl cyanoacetate) |
|---|---|---|---|---|---|
| 3 | zinc chloride 64.8 | dioxane, 250 | toluene solution; HCl | none | 73 |
| 4 | zinc chloride, 64.8 | dioxane, 250; toluene, 50 | $C_2Cl_3F_3$ solution; HCl | none | 60 |
| 5 | zinc chloride 64.8 | $C_2Cl_3F_3$, 340 | none | none | 36 |
| 6 | zinc chloride, 64.8 | $C_2Cl_3F_3$, 340 | none | $MgSO_4$, 29 | 39 |
| 7 | lithium salicylate, 6.5; salicylic acid, 6.5 | dioxane, 250 | HCl | acetic anhydride, 86 | 29 |
| 8 | lithium salicylate, 6.5; salicylic acid, 6.5 | dioxane, 250; $C_2Cl_3F_3$, 370 | HCl | acetic anhydride, 86 | 31 |
| 9 | zinc chloride, 64.8 | tetrahydrofuran | toluene; HCl | none | 57 |

TABLE 2

Reaction conditions and properties of methoxyethyl and ethoxyethyl 2-cyanopenta-2,4-dienoates

| No | 2-cyanopenta-2,4-dienoate | Acrolein to cyanoacetate (molar) | Catalyst, % to cyanoacetate | Solvent, % to cyanoacetate | Wash/extraction details | Yield of distilled product (% to cyanoacetate) | Boiling point (° C./mmHg) | $n^{20}_D$ |
|---|---|---|---|---|---|---|---|---|
| 1 | methoxyethyl | 1.2:1.0 | zinc chloride, 56.6 | dioxane, 217 | toluene solution extracted twice with 2N HCl | 50 | 80/0.35 | 1.5631 |
| 2 | methoxyethyl | 1.2:1.0 | zinc chloride, 56.6 | THF, 185 | toluene solution extracted twice with 2N HCl | 69 | | |
| 3 | ethoxyethyl | 1.2:1.0 | zinc chloride, 51.6 | THF, 170 | toluene solution extracted twice with 2N HCl | 61 | 80/0.3 | 1.4808 |

TABLE 3

Stability of allyl 2-cyanopenta-2,4-dienoate

| No | Content of hydroquinone (ppm) | Content of methane sulfonic acid (ppm) | Stability at room temperature (months) |
|---|---|---|---|
| 1 | 500 | 0 | 4 |
| 2 | 500 | 5 | 5 |
| 3 | 0 | 5 | 4 |
| 4 | 1000 | 5 | 0 |
| 5 | 1000 | 10 | 6 |
| 6 | 0 | 10 | 4 |
| 7 | 1000 | 0 | more than 12 |

TABLE 4

Adhesive bond strength of joints bonded with alkoxyalkyl- and allyl 2-cyanopenta-2,4-dienoates

| No | 2-cyanopenta-2,4-dienoate | Substrates | Mode of testing | Adhesive bond strength (kg/cm2) after 24 h at 20° C. | 100° C. | 120° C. |
|---|---|---|---|---|---|---|
| 1 | allyl | steel/steel | tensile | 68 | 80 | 75 |
| | | | shear | 39 | 62 | 67 |
| | | glass/steel | tensile | 47 | 78 | 78 |
| | | | shear | >20* | >20* | >20* |
| | | glass/glass | tensile | 36 | 71 | 69 |
| | | | shear | >19* | >20* | >20* |
| 2 | methoxyethyl | steel/steel | tensile | 43 | 101 | 132 |
| | | | shear | 23 | 92 | 106 |
| | | glass/steel | tensile | 32 | 120 | 118 |
| | | | shear | >20* | >20* | >20* |
| 3 | ethoxyethyl | steel/steel | tensile | 25 | 82 | 72 |
| | | | shear | 20 | 75 | 73 |
| | | glass/steel | tensile | 27 | 84 | 80 |
| | | | shear | >20* | >20* | >20* |

*- glass substrate failure

What is claimed is:

1. A composition consisting essentially of a distilled reactive ester of 2-cyanopenta-2,4-dienoic acid of the formula

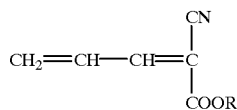

wherein R is alkyl, alkenyl, alkynyl, alkoxyalkyl, alkenyloxyalkyl, alkynyloxyalkyl, poly(oxyalkyl), aryl, cycloalkyl or heterocyclyc radical, or is one of these moieties substituted with one or more of the other moieties and could also contain halogens, purified by one or more subsequent distillations under vacuum to yield the distilled reactive ester, wherein said distilled reactive ester is more storage stable in monomeric form than it was prior distillation.

2. The composition of claim 1 wherein said reactive ester acts as an adhesive or a polymer upon polymerisation of the reactive ester.

3. The composition of claim 1 having an improved shelf-life as compared to compositions comprising non-distilled esters when the ester is in monomeric form.

4. The composition of claim 1 characterised with quicker setting time as compared to compositions comprising non-distilled esters when used as adhesives.

5. The composition of claim 1 wherein the reactive ester is free from impurities from the manufacturing process.

6. The composition of claim 1 wherein the reactive ester is capable of polymerisation to high molecular weight polymers via anionic, cationic, or radical mechanism, as well as via a combination of any of them.

7. The composition of claim 1 wherein the reactive ester is stabilised with anionic polymerisation inhibitors including but not limited to sulphur dioxide, hydrogen fluoride, phosphoric acid, phosphonic acids, sulfuric acid, sulphonic acid, carboxylic and organic sulfonic acids, sultones, boron trifluoride and its complexes, phosphazenes, in amounts of from 0.00001 to 1%.

8. The composition of claim 1 wherein the reactive ester is stabilised with free-radical polymerisation inhibitors including but not limited to hydroquinone, p-methoxyphenol, t-butyl catehol, butylated hydroxytoluene, butylated hydroxyanisole, in amounts of from 0.001 to 1%.

9. The composition of claim 1 wherein the reactive ester is capable of instantaneous polymerisation at ambient temperature when the composition is spread as a thin film between two substrates, producing an adhesive bond.

10. The composition of claim 1 wherein the reactive ester is capable of bonding metals, plastics, rubbers, glass, wood, paper, live, soft or bone tissue.

11. The composition of claim 2 characterised with enhanced bond strength, temperature and moisture resistance.

12. The composition of claim 1 wherein the reactive ester contains anionic polymerisation initiators, cationic polymerisation initiators, free-radical polymerisation initiators, compounds generating radicals or ions under visible, ulltraviolet or electron beam irradiation.

13. The composition of claim 1 wherein the reactive ester contains polymeric thickeners, viscosity regulators, plasticisers, thixotropic agents, compatibilisers, adhesion promoters, pigments, colourants, fillers, deodorants and perfumes.

* * * * *